United States Patent [19]

Mizokawa et al.

[11] Patent Number: 5,631,028

[45] Date of Patent: May 20, 1997

[54] GREEN TIRE CONVEYOR SYSTEM IN A TIRE VULCANIZER FACTORY

[75] Inventors: Takumi Mizokawa; Koji Ota, both of Toyohashi; Kashiro Ureshino; Katsumi Ichikawa, both of Takasago; Koichi Nomura, Tokyo; Tadashi Tomita, Ise, all of Japan

[73] Assignees: Kabushiki Kaisha Kobe Seiko Sho, Kobe; Shinko Electric Co., Ltd., Tokyo, both of Japan

[21] Appl. No.: 388,437

[22] Filed: Feb. 14, 1995

[30] Foreign Application Priority Data

Feb. 15, 1994 [JP] Japan ................... 6-041817

[51] Int. Cl.$^6$ ................................ B29C 35/02
[52] U.S. Cl. ............ 425/28.1; 425/29; 425/34.1; 425/38; 414/226; 414/799
[58] Field of Search ............ 425/28.1, 29, 34.1, 425/38, DIG. 108; 414/226, 799

[56] References Cited

U.S. PATENT DOCUMENTS

| | | | |
|---|---|---|---|
| 4,585,405 | 4/1986 | Capecchi | 425/38 |
| 4,625,101 | 11/1986 | Hinks et al. | 425/47 |
| 4,728,274 | 3/1988 | Siegenthaler | 425/38 |
| 4,773,810 | 9/1988 | Nishimura et al. | 414/331 |
| 4,778,060 | 10/1988 | Wessner, Jr. | 425/29 |
| 4,881,882 | 11/1989 | Fantacci | 425/38 |

*Primary Examiner*—James P. Mackey
*Attorney, Agent, or Firm*—Oblon, Spivak, McClelland, Maier & Neustadt, P.C.

[57] ABSTRACT

A conveyor system that performs a conveyance by using pallets for loading green tires and device for conveying these pallets, installs a storage area for storing pallets as they are on the way to convey, and uses robots for transferring the green tires from a pallet to a tire vulcanizer. Pallets being of such a type as to be able to load two or more green tires for planar placement and a conveyor devise is desired to be able to get under these pallets for lifting up. Furthermore, a visual sensor provided on a robot reads at least one of a mark concerning the specification of a green tire, a mark for its positioning on a pallet, and a mark for its positioning on a tire vulcanizer, identifies a green tire to be conveyed, and automatically performs a positioning in transferring the green tire from the relevant pallet and a positioning in transferring the green tire to a tire vulcanizer in the conveyor system. In addition, these tire vulcanizers, conveyor device, and robots are collectively controlled using computers.

13 Claims, 7 Drawing Sheets

GREEN TIRE CONVEYOR SYSTEM IN A TIRE VULCANIZER FACTORY

BACKGROUND OF THE INVENTION

1. Field of the Invention

The present invention relates to a conveyor system for conveying a green tire (crude rubber tire before vulcanization), supplied from the molding machine zone, to a specified tire vulcanizer in a tire vulcanizer factory.

2. Description of the Related Art

In a tire vulcanizer factory, numbers of tire vulcanizers are provided in a row, a stand for green tires is provided for each tire vulcanizer, and vulcanization is performed with the mold closed after a loader attached to each tire vulcanizer holds and conveys a green tire from a stand to a predetermined mold position for loading. Such tire vulcanizer group and the molding machine zone which produces green tires are installed adjacent to each other, but are not directly connected with each other. Thus, it is required to convey green tires from the molding machine zone to the stands of tire vulcanizers.

Such conventional green tire conveyor system includes the one using a hammock truck and a fork lift. A hammock truck is a truck on wheels with U-shaped hanging down hammocks provided, in each of which about 10 green tires are placed sideways. After manually loading green tires from the molding machine zone on a hammock truck and drawing them with a forklift to a tire vulcanizer, green tires have so far been manually transferred to the stand of the tire vulcanizer. Furthermore, because some amount of buffer needs to be prepared so as not to cause shortage of green tires in the event of troubles in the molding machine zone or switching to vulcanization of tires with different specifications, necessary amount has been reserved on the hammock trucks with green tires loaded thereon.

The above-mentioned conveyor system using the hammock trucks has had a problem in that the work requires manual operation and is not possible for everyone to operate because a green tire may happen to be more than 30 kg in weight. The group of tire vulcanizers did not mold a single specification of green tires but was often divided into two or more subgroups for molding green tires with different specifications. In such case, men had to read marks concerning the specifications on green tires, load the same specifications on green tires onto a hammock truck, and convey a specified hammock truck to a specified tire vulcanizer, and therefore the management became so complicated that there have been a fear of misoperations.

Thus, a system can be considered in which an automatic warehouse is installed between the group of tire vulcanizers and the molding machine zone and a connection is made with a conveyor between the molding zone and the automatic warehouse as well as between the automatic warehouse and each tire vulcanizer. However, since fixed facility such as automatic warehouses and conveyors is installed, there are a problem of being poor in flexibility, that is, significant modification in layout accompanying a change in the specification of green tires cannot be accomplished. Furthermore, such an automatic conveyor system is based upon the thought of conveying green tires one by one and so cannot be said to be an efficient conveyor system.

The present invention is made from a consideration of these problems in the prior art, and intended to provide a green tire conveyor system in tire vulcanizers that enables saving of energy due to automation, is so rich in flexibility as to easily follow a change in the specification of green tires, and is efficient with as the least possible waste.

SUMMARY OF THE INVENTION

A green tire conveyor system for solving these problems is a system that perform a conveyance by using pallets for loading green tires and device for conveying these pallets, disposes a storage area for storing pallets as they are on the way to convey, and uses a robot for transferring the green tires from a pallet to a tire vulcanizer. The pallets are of such a type as to be able to load two or more green tires for planar placement and a conveyor device is desired to able to get under these pallets for lifting up. According to the conveyor system of such a constitution, since minimum number of equipment such as pallets, conveyor devices, and robots is employed, a saving of energy due to automation is not only possible but a flexible production and layout can also be coped with and further a change in construction variety can be coped with even in a wide-variety production by the minimization of fixed equipment and exclusive equipment.

Furthermore, a visual sensor provided on a robot reads at least one of a mark concerning the specification of a green tire, a mark for its positioning on a pallet, and a mark for its positioning on a tire vulcanizer, identifies a tire to be conveyed, and performs an automatic positioning in transferring the green tire from the pallet and in transferring the tire to the tire vulcanizer. Also, the automatic positioning eliminates the need for a high precision in the conveyance of pallets, thereby simplifying a conveyor device.

In addition, these tire vulcanizers, conveying means, and robots are collectively controlled using computers. This collective control makes possible an efficient conveyance as a whole system, including the minimization of a buffer amount.

DESCRIPTION OF THE PREFERRED EMBODIMENTS

Figure 1:
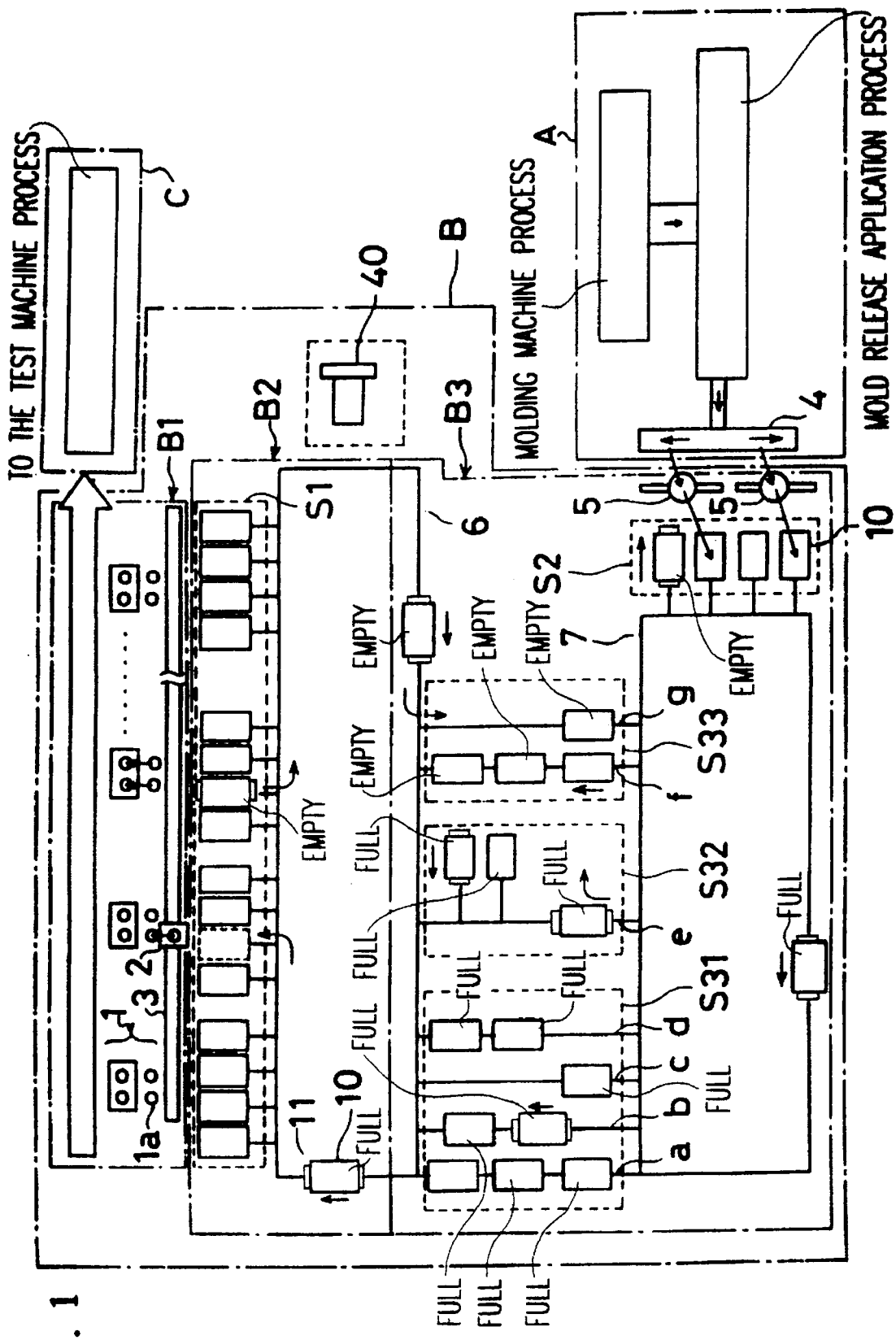
FIG. 1 is a layout of a conveyor system according to the present invention.

With reference made to the attendant drawings, an embodiment of the present invention will hereinafter be described. FIG. 1 is a layout drawing of a conveyor system. Incidentally, in the embodiment shown later, a twin-type tire vulcanizer will be described but a single-type tire vulcanizer (a mold per tire vulcanizer) is also constituted in a similar way.

A, B, and C in FIG. 1 show a molding machine zone, vulcanizer zone, and finishing zone, respectively. In particular, the vulcanizer zone B comprises a vulcanizer group area B1, conveyance area B2, and storage area B3.

The vulcanizer group B1 is provided with numbers of tire vulcanizers 1 placed in a row and second robots 2. The tire vulcanizer 1 is of the two-cavity specification with two cavities provided, to which two stands 1a for two green tires is attached corresponding to these two cavities. Second robots 2 are free to travel on a rail 3 laid down along the train of vulcanizers 1 and two or more of them are provided.

The conveyance area B2 is provided with a first palletyard S1 opposite the tire vulcanizer 1 and a first circulating route 6 linked with the storage area B3 mentioned later.

The storage area B3 is provided with a second palletyard S2 to be placed opposite the apportioning conveyor 4 of the molding machine zone A, two first robots 5 provided between the second palletyard S2 and the apportioning conveyor 4, a second circulating route 7 linking the second palletyard S2 with the storage areas mentioned later S31, S32, and S33, a first area S31 disposed between the first circulating route 6 and the second circulating route 7 and composed of the linking routes a, b, c, and d in which the first-in first-out storage is possible, a second area S32 disposed similarly end composed of the linking route e in which the random storage is possible, and a third area S33 disposed similarly and composed of the linking routes f and g in which empty pallets can be stored.

In the aforesaid first and second palletyards S1 and S2, the aforesaid first area S31 capable of first-in first-out storage, the aforesaid second area S32 capable of random storage, and the aforesaid third area S33 capable of empty pallet storage, pallets 10 are placed in a plane as illustrated. To convey these pallets 10, the conveyor devices 11 shown with black frame are free to travel along the aforesaid first and second circulating routes 6 and 7, and the aforesaid linking routes a to g. Furthermore, the conveyor devices 11 are free to advance to and retreat from pallets 10 in the first and second palletyards S1 and S2. Here, the first area S31 capable of first-in first-out storage is an area with the scheme of taking out a pallet in a linking route a from the earliest laid-on. This first area S31 is used for the mass production, where the linking routes a and b and the linking routes c and d are switched over to each other in use. The second area S32 capable of random storage lays pallets in routes branched a right angle from the liking route e. Because of independence from the sequence of taking in or out, this second area S32 is used for wide-variety small-scale production. The third area S33 capable of empty pallet storage stores empty pallets in the same way as with the first-in first-out storage. Further, the linking route f and the linking route g are switched over to each other in use.

Next, with reference made to FIG. 2, the control blocks in the aforesaid individual areas B1, B2, and B3 will be described. In the vulcanizer group area B1, tire vulcanizers 1 are connected to a tire vulcanizer controller 51 and second robots 2 are connected to a robot controller S2. The tire vulcanizer controller 51 and robot controller 52 are connected to a vulcanizer group control computer In the conveyance area 92, the conveyor devices 11 are connected to a controller 54. The controller 54 is connected to a conveyance area control computer 55. In the storage area B3, conveyor devices 11 are connected to a controller 56 and first robots 5 are connected to a robot controller 57. The controller 56 and robot controller 57 are connected to a storage area control computer 58. And, the aforesaid vulcanizer group, conveyance area, and storage area control computers 53, 55, and 58 are collectively controlled by a vulcanizer zone process control computer 59. Moreover, this vulcanizer zone process control computer 59, together with the molding machine zone and finishing zone process control computers 60 and 61, is collectively controlled a factory host computer 62.

Figure 3:
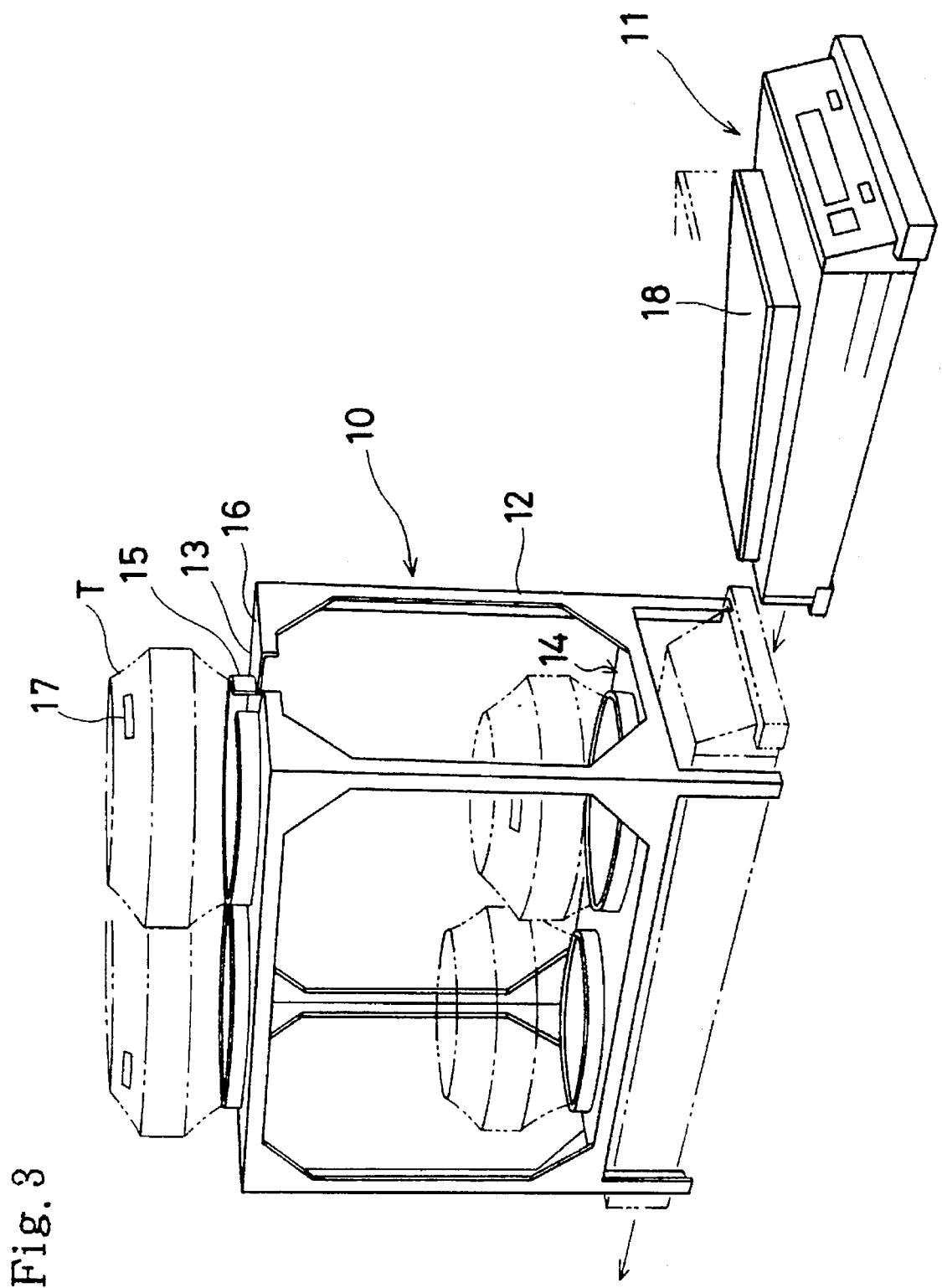
FIG. 3 is a perspective view of a pallet and conveyor device.

Now, the structure and operation of pallets 10 and conveyor devices 11 to be used in the aforesaid individual areas B1, B2, and B3 will be described with reference made to FIG. 3. A pallet 10 comprises four pillars 12, a upper board shelf 13, and a lower board shelf 14. On the board of each shalt 13, 14, two stand 15 are provided. Four green tires T can be loaded on one pallet 10 in all. A pallet 10 has a symmetrical shape in the longitudinal direction. Even if a conveyor device accesses from either of the back and front sides to a pallet 10, there is a stand 15 at the same position. In this way, the number of green tires T to be simultaneously conveyed and transferred on a pallet is so constructed as to become even, such as 4, 6, 8, . . . On the other hand, on the four corners of the upper board 13, the respective guide marks 16 for positioning, such as +, are stamped. The robots described later can identify the center of a green tire T with these guide marks 16. Moreover, on a green tire T, a mark 17 indicating the specification is stamped. It can be identified with the mark 17 whether the robot described later is a green tire with the specification meeting the requirement or not.

A conveyor device 11 is an unmanned conveyance wheel capable of automotively traveling along the standard line embedded in the floor surface or drawn on the floor surface. This conveyor device 11 can get under a pallet 10 either from the back or the front as indicated by a two-dot chain line. And, with the conveyor device 11 kept under a pallet 10, the pallet 10 is loaded on or unloaded from an elevating stand 18 by up-down of the elevating stand 18 of the conveyor device 11. A conveyor device 11 can pass without any hindrance below irrelevant pallets 10 with the elevating stand 18 kept down. To be more specific. When a conveyor device 11 raises the vertically movable elevating stand (pallet supporting portion) 18 after getting under the desired pallet 10 and stopping at the position of two dot chain lines, the pallet 10 comes to be on the conveyor device 11. In this state, the pallet 10 is conveyed with the conveyor device 11. On the contrary, when the elevating stand 18 at the position of two dot chain lines lowers, the pallet 10 is laid at that position in a plane. That is, a pallet 10 can be laid appropriately on a possible track of conveyor device 11 traveling. Consequently, the installation of the aforesaid first palletyard S1, second palletyard S2, first area S31 capable of first-in first-out storage, second area S32 capable of random storage, and third area S33 capable of empty pallet storage can be flexibly changed. In addition, these areas can be formed if only there is a piece of floor and requires no fixed equipment, thereby permitting an inexpensive preparation. Incidentally, a floor traveling conveyor device 11 is preferable from the standpoint of minimization of fixed equipment. However, even when using a ceiling conveyance wheel that freely travels on a rail placed beneath the ceiling as a conveyor device for hanging a chuck capable of holding a pallet at an optional height, a planar placement of a pallet 10 is possible.

Figure 4:
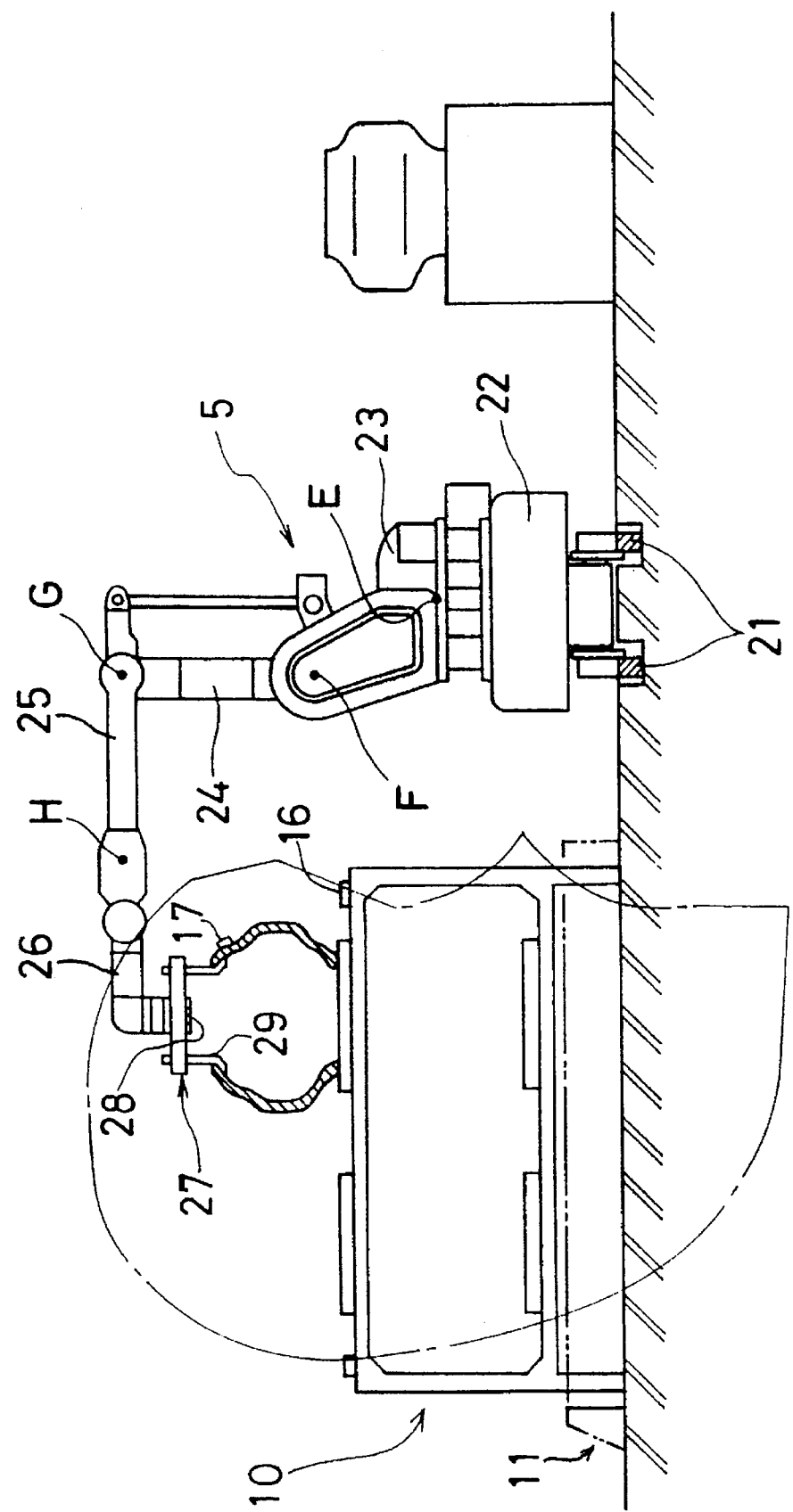
FIG. 4 is a side view of a robot.

The structure and operation of robots 2 and 5 for transferring a green tire with respect to pallets 10 in the aforesaid first and second palletyards S1 and S2 will hereinafter be described with reference made to FIG. 4. FIG. 4 illustrates the transfer of a green tire T onto a pallet 10 in the second palletyard S2, but the transfer of a green tire T from the first palletyard S1 either onto the stand 1a of a tire vulcanizer 1 or onto the mold center of a tire vulcanizer 1 is also performed similarly.

This robot 5 has a turning stand 23 and robot arm on a truck 22 traveling on the rail 21. This robot arm comprises a first arm 24, second arm 25, and third arm 26, is free to turn at the point E, and is free to bend at the points F, G, and H. Consequently, this robot arm is able to move to a given position of X, Y, end Z in the longitudinal, lateral, and vertical direction while keeping the horizontal position of the third arm 26. And, to the tip of the third arm 26, a chuck 27 and a visual sensor 28 like a CCD camera are attached downward.

This chuck 27 has chuck paddles 29 arranged at equipartitioned positions on a circle in such a manner that they are free to advance or retreat all together in the radial direction. These chuck paddles 29 hold the inside or outside of the top bead in a green tire T. The visual sensor 28 illustrated is attached to the center inmost of the chuck 27. Incidentally, the attachment position of a visual sensor 28 is allowed to be any place where a guide mark 16 of a pallet 10 or a mark 17 concerning the specification of a green tire T could be identified. Since the visual sensor 28 identifies a guide mark 16 of a pallet 10, the positioning of a robot arm relative to the center of the green tire T can be easily made. Consequently, without need for raising the installation accuracy of a pallet 10 itself, the aforesaid robot arm itself changes the access position to a pallet 10. The visual sensor 28 does not identify only the presence of green tires T, but reads a mark 17 concerning the specification and also checks for the specification related to kind of a green tire T. Consequently, a robot 5 transfers a desired green tire T from the molding machine zone A onto a pallet 10 while checking which green tire T is of the required specification, and transfers the desired green tire T onto a given vulcanizer 1. As a result, a trouble of misoperation in taking up of a green tire T has been eliminated which is likely to take place when the judgment of a person is inserted in the process. Moreover, not only the aforesaid visual sensor 28 but also a distance sensor is attached to a robot 5 and accordingly the height adjustment of a robot arm can be implemented.

This robot arm has a operating region indicated by a one dotchain line. Consequently, two green tires T on each of the upper and lower shelves in a pallet 10 can be transferred in sequence.

Figure 5:
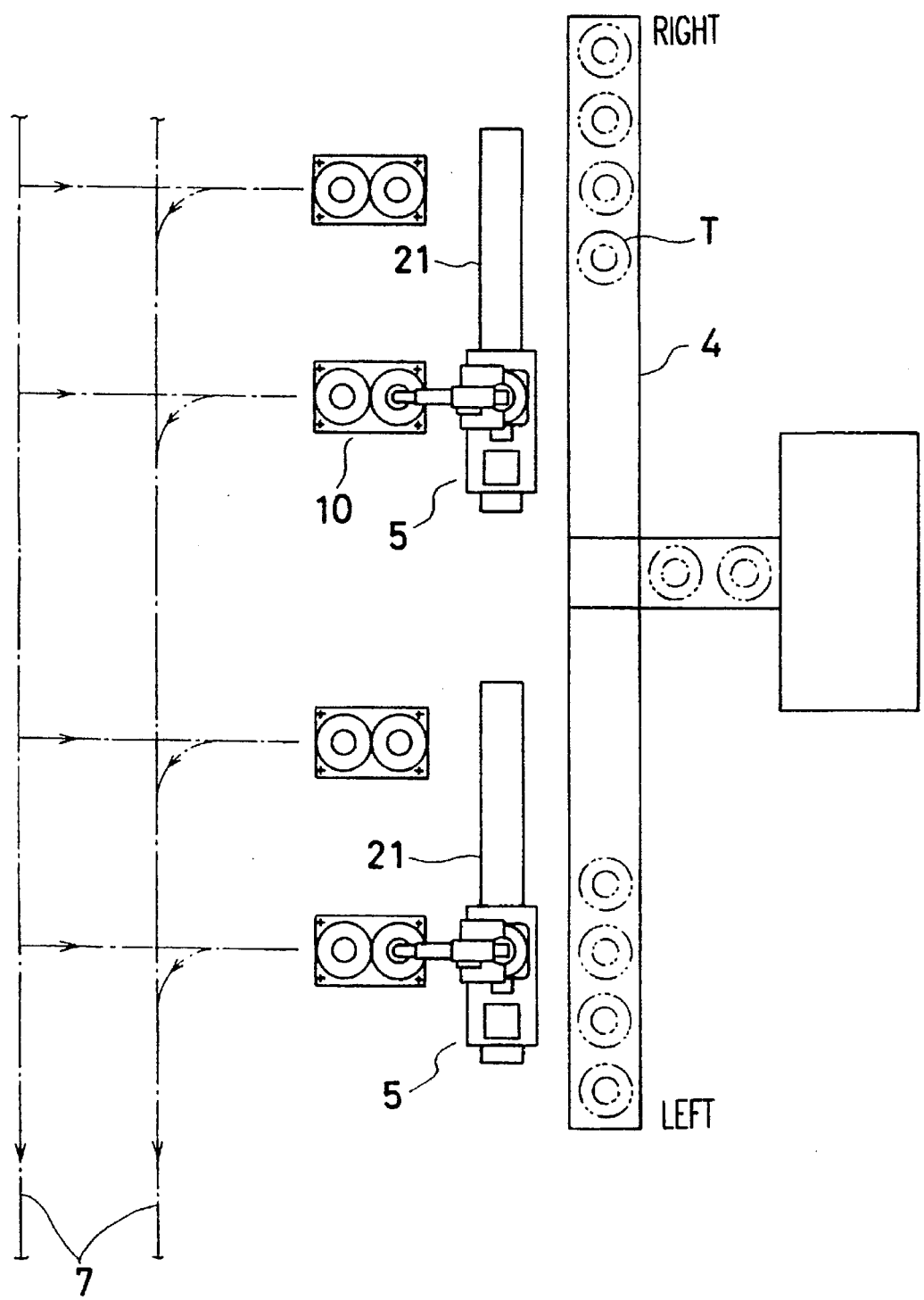
FIG. 5 is a plane view illustrating the transferring of a pallet from the molding machine zone.

An example of transferring a green tire T from an apportioning conveyor 4 onto a pallet 10 by using the aforesaid robot 5 will be described in further detail with reference made to FIG. 5. An apportioning conveyor 4 apportions green tires T to the right and/or to the left and conveys them. And, two robots 5 are individually provided at the aforesaid right and left apportionment sections. Each robot 5 transfers a green tire T from the apportioning conveyor 4 onto either of two pallets 10. Use of two robots 5 like this is for the purpose of preventing the conveyance from entirely stopping in the case of occurrence of failures. The pallet 10 onto which a green tire T has been transferred is conveyed along the circulating route 7.

Figure 6:
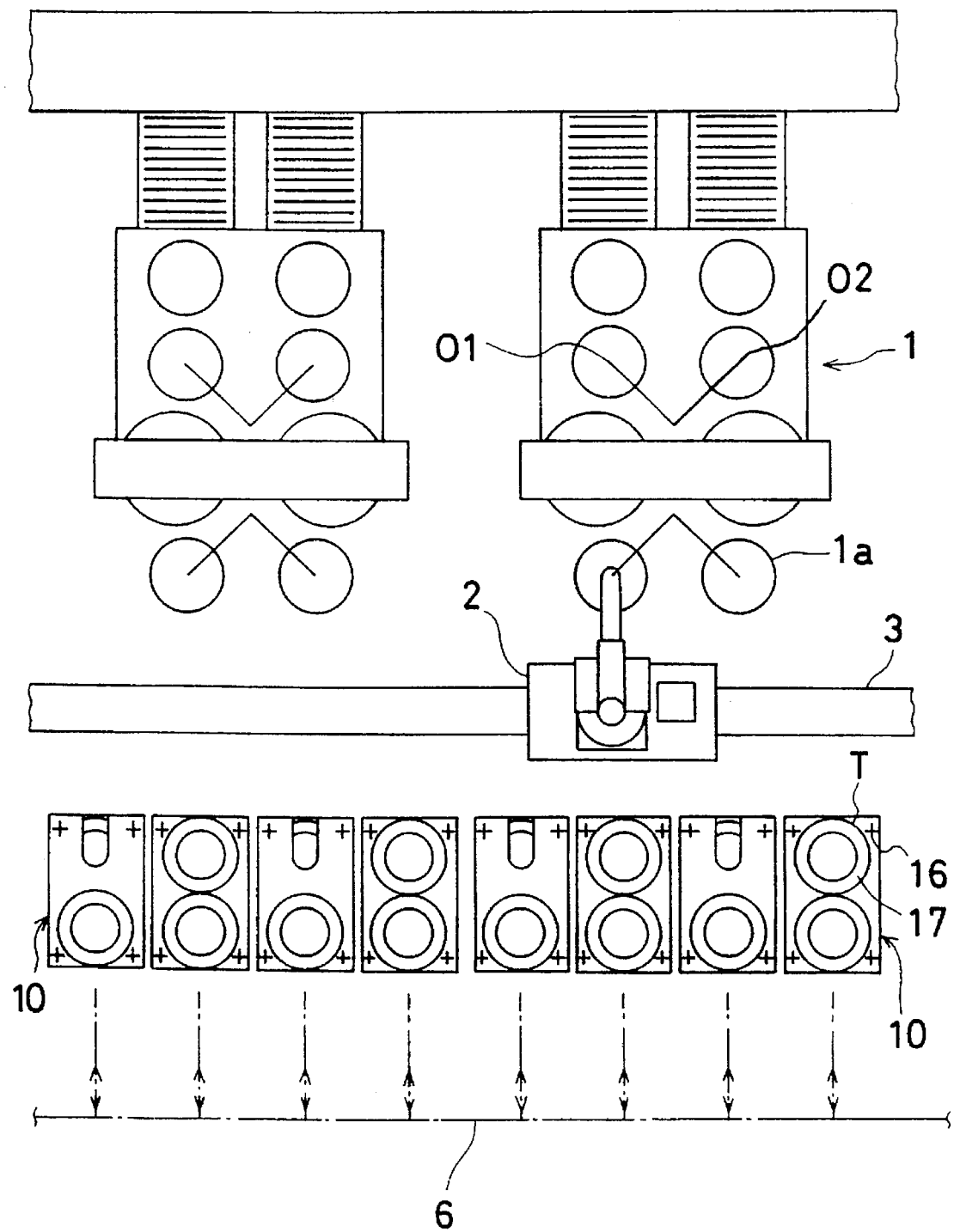
FIG. 6 is a plane view illustrating the transferring of a pallet to each vulcanizer.

Furthermore, an example of transferring a green tire T from a pallet 10 onto a tire vulcanizer 1 by the aforesaid robot 2 will be described with reference made to FIG. 6. Four pallets 10 are so provided in a row as to be opposed to individual vulcanizers 1. Between these pallets 10 and the vulcanizers 1, a robot 2 is so disposed as to freely travel along the rail 3. The structure and operation of a robot 2 itself is the same as is shown in FIG. 4. A robot 2 looks at the guide mark 16 of a pallet 10 with the visual sensor 28, positions the robot arm relative to the center of a green tire T, further makes sure that the green tire T is of a desired specification based on the mark 17, and transfers the green tire T from the pallet 10 onto a stand 1a. For a system in which a given numbers of tire vulcanizer 1 corresponds to a single robot 2, if this one robot 2 fails or becomes inoperative due to an unexpected accident, the operation of tire vulcanizers in charge of the robot 2 comes practically to a standstill. Thus, robots 2 are provided also in a plurality. And, a robot of the adjacent group is used over both groups and a disabled robot is repaired meanwhile.

Figure 7:
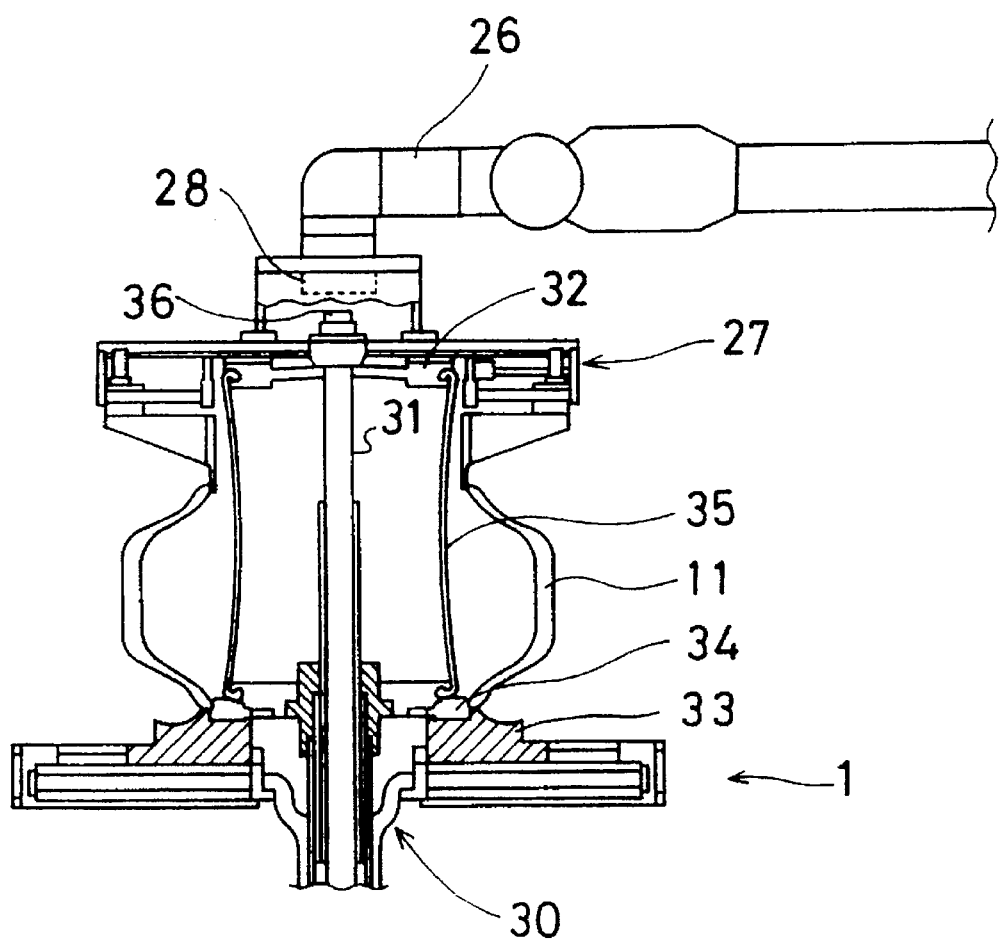
FIG. 7 is a sectional view illustrating a state of directly transferring a green tire to the mold of a tire vulcanizer with the aide of a robot.

Incidentally, a robot 2 can transfer a green tire T directly onto the mold centers o1, o2 in a tire vulcanizer 1. In this case, it is preferred that a robot 2 has two robot arms. FIG. 7 shows a state of positioning in a case of direct transfer onto the mold center. To the center of a tire vulcanizer 1 is attached a bladder manipulating device 30. This bladder manipulating device 30 has a center post 31 free to rise or lower and a bladder 35 held between a top ring 32 fixed on the top of the post 51 and the bead ring 34 of the lower mold 33. At the center position right above this center post 31, a guide mark 36 as a given standard is stamped. The visual sensor 28 identifies a guide mark 36 in two dimensions like a TV and detects a displacement from the center of the guide mark 36. Based on a signal from the visual sensor 28, the entire robot arm is controlled in such a manner that the third arm 26 may be horizontally positioned right above the guide mark 36. Such a high accuracy as within 0.25 mm has come to be required in the centrality between the chuck 27 and the mold center of a tire vulcanizer 1. For this reason, the positional detection with the visual sensor 28 and a correction of the centrality are important. In particular, a construction of stamping the guide mark 36 to the top center of the center post 31 of the bladder manipulating device 30 enables a high accuracy transfer of a green tire to be easily coped with.

The procedure of conveying a green tire by using the aforesaid conveyor system will hereinafter be described. First, the procedure of the storage area B3 will be described.

In FIG. 1, lot-controlled green tires of the same specification are supplied together from the molding machine process to the mold release applying process in the molding machine zone A and, after the application of mold release are continuously supplied to both wings of the apportioning conveyor 4. Since the number of pallets 10 to be loaded is four, the number of equi-specification green tires to be supplied becomes a multiple of four. This information as to supply is automatically transferred from the vulcanizer zone process control computer 59 of FIG. 2 to the storage area control computer 58 and thereafter the storage is automatically carried out.

Returning to FIG. 1, equi-specification green tires on the apportioning conveyor 4 are transferred to pallets 10 in the second palletyard S2 by means of first robots 5, 5. Onto a pallet 10, four green tires are transferred in sequence from the rear to the forepart on the lower step and from the rear to the forepart in all (cf. state of FIG. 3).

Figure 2:
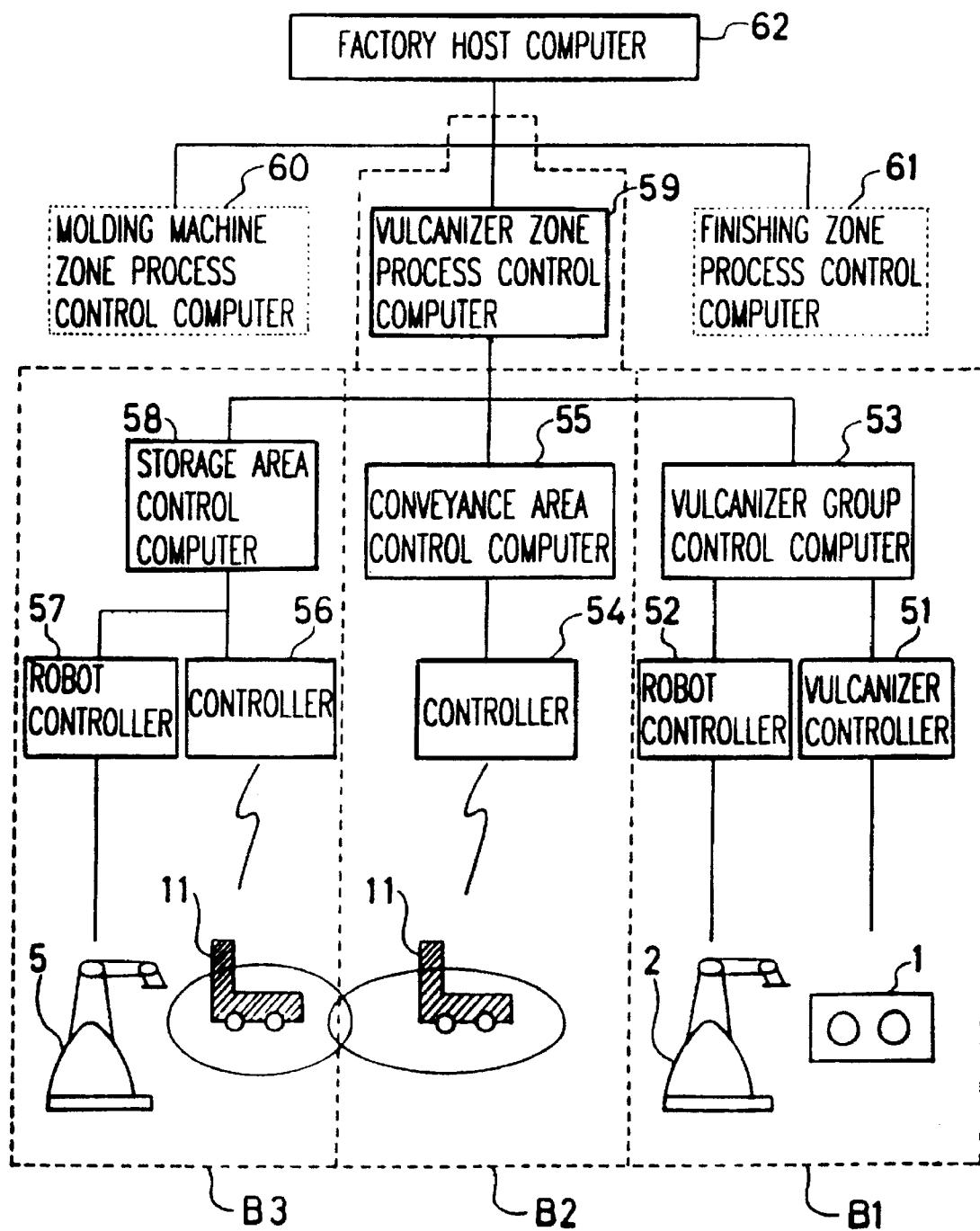
FIG. 2 is a control block diagram of the conveyor system.

When four green tires transferred, a first robot 5 issues a conveyance request signal to the storage area control computer 58 of FIG. 2 and at the same time performs a transfer to an adjacent empty pallet 10. To correct an error in installed position of a pallet 10 prior to the aforesaid transferring operation of a first robot 5, the visual sensor 28 of FIG. 4 looks at the guide mark 16 and corrects the position to which the robot arm is to access. At the same time, from an observation of the mark 17 of a green tire it is revealed whether the specification meets a desired one or not.

As shown in FIG. 4, the conveyor device 11 gets under the pallet 10 onto which the loading has finished, lifts up the pallet 10, and conveys the pallet 10 along the second circulating route 7 of FIG. 1. If the specification of a green tire is for mass production, the pallet 10 is conveyed to the first area S31 capable of first-in first-out storage and lays behind the last conveyed pallet 10. If the specification of a green tire is for wide-variety small-scale production, a conveyor device 11 conveys the pallet 10 to an empty site in the second area S32 capable of random storage, lays the pallet 10 on that site, and returns. The stock control in the first area S31 capable of first-in first-out storage and the second area S32 capable of random storage is carried out by the storage area control computer 58 of FIG. 2.

And, when the second palletyard S2 falls short of pallets, a conveyor device 11 lifts up an empty pallet from the third area S33 capable of empty pallet storage and conveys the empty pallet to the second palletyard S2. By an iteration of the procedure mentioned above, the storage of green tires in the storage area B3 is executed.

Next, the procedure in the conveyance area B2 will be described. A request for a green tire comes from the vulcanizer group control computer 53 of FIG. 2. If the specification of a green tire is for mass production, the pallet 10 to be conveyed next to the last conveyed pallet 10 is lifted up from the first area S31 capable of first-in first-out storage. If the specification of a green tire is for wide-variety small-scale production, the relevant pallet 10 of the second area S32 capable of random storage is lifted up by a conveyor device 11. And, the conveyor device 11 travels along the first circulating route 6, lays the relevant pallet 10 at an empty position before a desired vulcanizer 1 in the first palletyard S1, and returns.

The vulcanizer group control computer 53 of FIG. 2 issues a request signal for the conveyance of empty pallets 10 to conveyor device 11 when the transferring of all green tires onto stands 1a of tire vulcanizers 1 is completed and all pallets 10 become empty. Then, a conveyor device 11 lifts up and conveys an empty pallet 10, lays the empty pallet 10 at the position next to the last laid empty pallet in the third area S33 capable of empty pallet storage, and returns. By an iteration of the procedure mentioned above, the conveyance of green tires to tire vulcanizers 1 is carried out.

Furthermore, the procedure in the vulcanizer group B1 will be described. While periodically traveling on the fall 3, a second robot 2 of FIG. 1 stops and performs a feeding operation of green tires if a stand 1a of a vulcanizer 1 becomes empty. First, the visual sensor 28 attached to the tip of the robot arm observe the guide mark of a pallet 10 and a positional deviation of pallet installation and a deviation in the stop position of the second robot 2 is corrected based on a signal from the visual sensor 28 (of. FIG. 6). After the completion of these positional corrections, the robot arm moves after the center of a green tire, holds and takes up the green tire, and supplies it to an empty stand 1a of a tire vulcanizer 1. At that time, it is also made clear using the visual sensor whether the green tire meets a required specification or not, thereby preventing a green tire different in specification from being vulcanized and molded in error. Incidentally, taking a green tire out of the pallet 10 is performed first from the forepart on the upper step and then from the lower step. And, the second robot 2 prepares for the next transferring while traveling on the rail 3.

After the completion of transferring all green tires in the pallet 10, a signal of request for the conveyance of an empty pallet is issued to the conveyance area control computer 55 of FIG. 2 and at the same time a signal of request for the supply of a fully occupied pallet 10 with four green tires loaded is issued. At that time, the second robot 2 takes out green tires An sequence from the fully occupied pallet next to the empty pallet 10. After an empty pallet 10 is conveyed out by using a conveyor device 11, the conveyance area control computer 55 directs the controller 56 (cf. FIG. 2) of a conveyor device 11 the operation of supplying a fully occupied pallet 10 for execution.

A second robot 2 must perform a transfer operation in the front of the pallet 10 and so cannot perform the transferring onto the stand 1a of a vulcanizer 1 within the operating range in some cases. In these cases, the second robot 2 takes countermeasures by changing the stop position on the rail 3. It is also possible to link the travel of this second robot 2 with the control schedule function (for example, the time of vulcanization completion is shifted in succession for operation) of vulcanizer group control computer of FIG. 2. Incidentally, this vulcanization group control computer 53 divides the tire vulcanizer group into blocks and enables an autonomic operation for every block.

The aforesaid tire vulcanizer 1 has the function of mounting a green tire from the stand 1a to the mold center by means of a loader, the function of controlling and detecting the position of various machines, the function of remotely setting a shaving pressure, postcure inflator inner pressure, or mold clamping force, and the function of automatically adjusting a postcure inflator rim interval or split mold stroke. The setting of data on these functions is stored according to the specifications of tires can be downloaded from the factory host computer 62 to the vulcanizer process control computer 59 of FIG. 2. Consequently, when green tires different in specification are conveyed on instructions from the factory host computer 62, the vulcanizer zone process control computer 59 issues an instruction to the vulcanization controller 51, an alteration in arrangements accompanying a change in specification that means a change in the type of green tires is performed, and the conveyance area control computer 55 and storage area control computer 58 also perform a change in the optimal amount of storage. Also, these computers form a dual system and enable the down of the entire system to be avoided.

In this way, even if there happens a change in specification, to minimize the buffet amount of green tires (the quantity required till the restoration of a failure in the molding machine zone, the interim storage amount required during the time taken for an alteration in arrangements) becomes possible. In accordance with a balance between this necessary minimum buffer amount and the amount of production, an instruction on where storage should be performed either in the first area S31 capable of first-in first-out storage or in the second area S2 capable of random storage is issued from the vulcanizer zone process control computer 59 to the storage area control computer 58.

Incidentally, in FIG. 1, the mold replacement of a tire vulcanizer 1 is performed using a mold replacement fork lift 40. In operating this fork lift 40, pallets 10 form obstacles. Thus, the supply of fully occupied pallets is interrupted and all pallets in front of a specified tire vulcanizer 1 are emptied and conveyed out. Then, the flexibility of a conveyor system is also obtained that an operating space for mold replacement is formed in front of the tire vulcanizer. After the completion of mold replacement, fully occupied pallets 10 are conveyed again to the front of the relevant vulcanizer 1.

What is claimed is:

1. A conveyor system for conveying green tires to a plurality of tire vulcanizers, comprising:
   pallets for loading said green tires;
   a storage area in which said pallets are stored;
   a conveyor device for moving said pallets between said storage area and said tire vulcanizers as well as within said storage area, wherein said conveyor device is movable along a conveying route and has a vertically movable pallet supporting portion; and robots for transferring said green tires loaded on said pallets and moved by said conveyor device to said tire vulcanizers.

2. A conveyor system for conveying green tires to a plurality of tire vulcanizers, comprising:

pallets for loading said green tires;

a storage area in which said pallets are introduced and stored;

a conveyor device for moving said pallets between said storage area and said tire vulcanizers as well as within said storage area; and robots for transferring said green tires loaded on said pallets and moved by said conveyor device to said tire vulcanizers, wherein said storage area comprises:

a first area in which said conveyor device is arranged to move said pallets such that said pallets are removed from said first area by said conveyor device in the same sequence in which said pallets were introduced into said first area, a second area in which said conveyor device is arranged such that said pallets may be removed from said second area by said conveyor device in a random sequence, and a third area in which empty ones of said pallets are stored.

3. A conveyor system for conveying tires to a plurality of tire vulcanizers, comprising:

pallets for loading said green tires;

a storage area in which said pallets are stored;

a conveyor device for moving said pallets between said storage area and said tire vulcanizers as well as within said storage area; and robots, each of which is movable to positions for transferring said green tires loaded on said pallets to a plurality of said tire vulcanizers.

4. The conveyor system of claim 1 including further robots positioned for transferring green tires from a molding machine zone to said pallets.

5. The conveyor system of claim 4 including a computer for controlling said tire vulcanizers, said conveyor device and said robots.

6. A conveyor system as set forth in claim 3, wherein said robots are complementary with each other so that another of said robots may be used when one of said robots becomes inoperative and said inoperative robot is repaired.

7. A conveyor system as set forth in claim 5, wherein said computer controls so that a storage amount of said green tires in said storage area may be a minimum amount which should be consumed during required time for restoring said molding machine zone from a trouble state or changing a kind of said green tires to another kind of said green tires in said molding machine zone.

8. A conveyor system as set forth in claim 5, wherein said storage area comprises:

a first area in which said conveyor device is arranged to move said pallets such that said pallets are removed from said first area by said conveyor device in the same sequence in which said pallets were introduced into said first area, a second area in which said conveyor device is arranged such that said pallets may be removed from said second area by said conveyor device in a random sequence, and wherein said computer decides which said area is appropriate for a produced amount of each kind of said green tires in said molding machine zone.

9. A conveyor system as set forth in claim 2, wherein said storage area is formed by placing many of said pallets at a given position on the floor.

10. A conveyor system as set forth in claim 1, wherein said pallet can load two or more horizontally oriented green tires and has a shape symmetrical front-to-back in a traveling direction of said conveyor device.

11. A conveyor system as set forth in claims 1 or 10, wherein said pallets are placed in a row at a given position in front of a preselected one of said tire vulcanizers by said conveyor device and the empty ones of said pallets are collected by said conveyor device.

12. A conveyor system as set forth in claim 1, wherein said storage area is formed by placing many of said pallets in order at a given position on the floor.

13. A conveyor system as set forth in claim 1, wherein each of said robots is provided with a visual sensor able to read at least one of a mark concerning the specification of said green tire, a mark for positioning the tire on said pallet, and a mark for positioning the tire on one of said tire vulcanizers.

* * * * *